Nov. 8, 1927.
E. C. PFAFF
1,648,323
CLUTCH
Filed Jan. 6, 1927
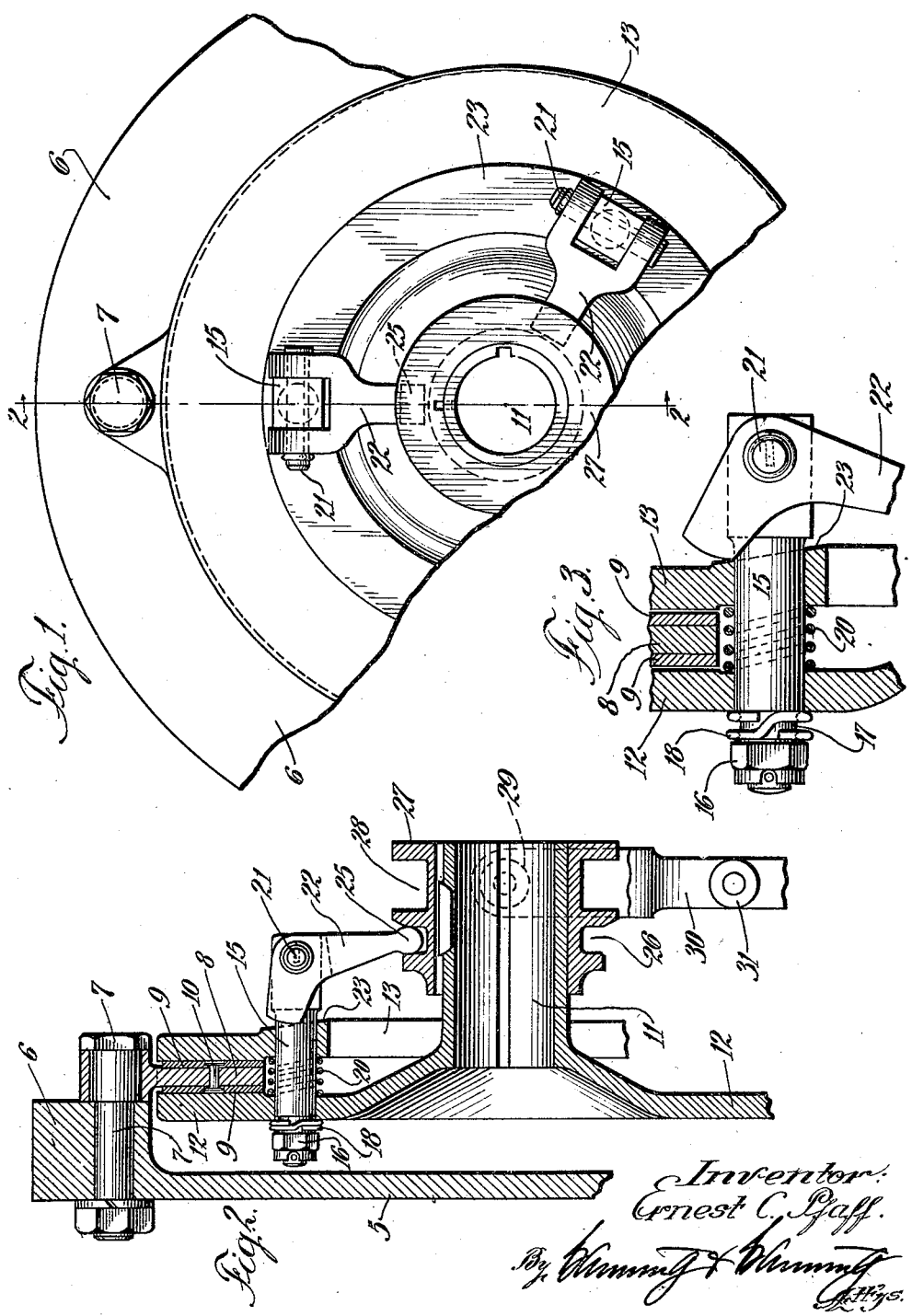
Inventor:
Ernest C. Pfaff.

Patented Nov. 8, 1927.

1,648,323

UNITED STATES PATENT OFFICE.

ERNEST C. PFAFF, OF CHICAGO, ILLINOIS.

CLUTCH.

Application filed January 6, 1927. Serial No. 159,271.

This invention relates to a clutch mechanism designed to effect a gradual engagement between driving and driven elements by the use of parts which are simple, inexpensive, and readily assembled; and it is particularly concerned with a means by which motion is communicated to the driven element through a pair of plates to which friction is applied with equal pressures from opposite sides of a driving member. The present improvements are also concerned with the use of certain compression springs which produce an initial easy engagement of the clutch parts, the springs being finally compressed solid so as to produce at all times a flexible engagement, thereby preventing the transmission of a harsh action to the associated mechanism.

A suggestive embodiment of this invention is set forth in the accompanying drawing in the manner following:

Figure 1 is a fragmentary view in elevation looking toward one end of the clutch driven member and shows also a portion of the driving member associated therewith;

Fig. 2 is a transverse section therethrough on line 2—2 of Fig. 1; and

Fig. 3 is an enlarged detail in section showing certain of the spring parts of Fig. 2 expanded to release position.

Referring particularly to Figure 2, I have shown a wheel 5 having a rim 6 to which is connected, as by bolts 7, a flange 8, transversely related to the wheel axis, which forms the driving member. Mounted upon opposite sides of this flange are friction rings 9 which may be made of asbestos or other suitable heat absorbing material, preferably secured to the flange as by rivets 10. The parts above described constitute a unit which may be termed the driving member.

The driven unit of the present clutch may comprise a hub 11 designed for fast mounting on a shaft (not shown). Extending radially from the hub is a flange 12 which is disposed by preference adjacent the ring 9 which is proximate to the wheel 5. A circular plate 13 is also associated with this flange, being disposed adjacent the other ring 9. Extending through aligned openings in the flange and plate are pins or bolts 15, preferably three in number, and each provided with a stop at one end, as shown. The bolt ends adjacent the wheel are each reduced and threaded to receive a nut 16 the rear end whereof abuts a shoulder which is formed by a portion 17 of the bolt which is of enlarged diameter as compared to the threaded end. This bolt portion 17, however, is of less diameter than the bolt body so that the portion 17 constitutes, in effect, an annular recess wherein may be accommodated a compression spring 18 having, by preference, but very few coils which are in parallelism, as shown. The ends of the spring are so related to the cross-over portion thereof as not to overlap therewith, whereby the spring may be compressed with the coils touching each other at every point, as well as the nut on one side and the proximate face of the flange 12 on the other side. Between the flange 12 and plate 13 are other compression springs 20, one surrounding each bolt 15, and each tending to separate the flange and plate from each other and from the friction rings 9 which they are designed to engage under pressure.

The outer or front end of each bolt 15 may be provided with a square head to receive transversely therethrough a pivot pin 21 which carries the forked end of a bell crank lever 22. The two forks of this lever extend toward the plate 13 for engagement with an inclined face 23 thereupon, and impart to this plate a variable pressure depending upon the angular position of the lever in relation thereto. The end of the lever opposite its forks may be rounded as at 25 for loose engagement within a groove 26 which is formed in a collar 27 having a keyed and slidable mounting on the hub 11. A second groove 28 in this collar is adapted to receive loosely a pair of studs 29 projecting inwardly from the forked end of an operating lever 30 having a pivotal mounting as at 31. By movement transmitted through this lever the longitudinal position of the collar may be shifted whereby to actuate in unison the several bell crank levers connected therewith, and in this way the pressure upon the plate 13 is varied at will.

In operation, when the clutch is released the parts will occupy positions somewhat as indicated in Fig. 3. The spring 18 is fully expanded, so that the flange 12 and plate 13 are loose with respect to the friction rings 9. This relationship of the parts is assured also by expansion of the spring 20. When the clutch is to be engaged, movement transmitted simultaneously to the levers 22 will cause the bolts 15 to be longitudinally shifted to the position of Fig. 2. In undergoing this movement the springs 18 create a soft engagement due to the fact that their coils must be compressed solid before movement of the bolts with respect to the flange 12 can be stopped. From this point on, there is no further slipping between these bolts and the flange. It will be noted that equal pressures are applied both to the flange 12 and plate 13 from opposite ends of the bolt, and that these two parts are pressed against the friction rings 9 so as to receive a driving torque from the common driving member 8. While the clutch parts are undergoing a change in position, a flexible engaging period is assured by reason of the expansion or contraction of the springs 18, this period being definitely ended when the clutch is fully engaged or released.

I claim:

1. A clutch having a driving member and a driven unit consisting of two members each engageable with opposite faces of the driving member, bolts loosely connected with the two driven members having a common cam means for shifting their longitudinal positions in unison, a nut on each bolt, a compression spring between the nut and one member of the driven unit and adapted to impart a resilent thrust to one driven member, and other spring means tending normally to separate said driven members, substantially as described.

2. A clutch in which is comprised a driving member having a pair of friction faces, and a driven unit comprising a pair of members one engageable with each friction face of the driving member, means slidably connecting the two driven members whereby they may be moved toward and from each other and the driving member, a stop on each of said connecting means, a compression device interposed between the stop and the proximate driven member whereby to exert upon the latter a resilient thrust, a cam device for each of said connecting means, and a common operating connection for each of said cam devices whereby the said connecting means may be shifted in unison to move the two members of the driven unit toward or from the driving member, substantially as described.

3. A clutch in which is combined a driving member having a pair of friction faces, a driven unit comprising a pair of members one in engagement with each face of the driving unit, means loosely connecting the two driven members and provided at one end with a stop and at the other with a cam device, a spring associated with each of said connecting means and interposed between the two members of the driven unit to normally cause a separation thereof, other spring means interposed between each stop and the proximate driven member whereby to apply thereto a resilient force when the stop approaches said member, and a common means connecting the several cam devices whereby the means connecting the two driven members may be moved in unison toward or from the driving member, substantially as described.

4. In a clutch, the combination of a driving member having opposite friction faces, a driven unit provided with two members one associated with each face of the driving member, means loosely extended through the two members of the driven unit, a stop at one end of each said means, springs coiled around said means and interposed between the stops and one member of the driven unit, the coils of the springs being parallel when compressed and adapted before compression to transmit a resilient force to the member when the stop is moved in its direction, and means connected with each of said means for producing a shift in their positions whereby a uniform pressure is applied to the two driven members for engagement with opposite faces of the driving member, substantially as described.

5. In a clutch, the combination of a two-faced driving member and a driven unit having two members one engageable with each face of the driving member, spring means tending normally to release the driven members from engagement with the driving member, and other means connecting the two driven members loosely with each other and including a stop, a spring between the stop and one driven member, and a cam device bearing against the other driven member and adapted to shift the connecting means endwise whereby a resilient force is transmitted from the stop, substantially as described.

ERNEST C. PFAFF.